(12) United States Patent
Lim

(10) Patent No.: US 12,525,665 B2
(45) Date of Patent: Jan. 13, 2026

(54) BATTERY CONTACT MEMBER

(71) Applicant: HYUNDAI MOBIS Co., Ltd., Seoul (KR)

(72) Inventor: Tae Hoon Lim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 911 days.

(21) Appl. No.: 17/747,781

(22) Filed: May 18, 2022

(65) Prior Publication Data

US 2022/0376324 A1     Nov. 24, 2022

(30) Foreign Application Priority Data

May 20, 2021  (KR) .................... 10-2021-0065112

(51) Int. Cl.
| | |
|---|---|
| *H01M 10/6551* | (2014.01) |
| *F28F 9/007* | (2006.01) |
| *H01M 10/613* | (2014.01) |
| *H01M 10/625* | (2014.01) |
| *H01M 10/6554* | (2014.01) |
| *H01M 50/249* | (2021.01) |
| *H01M 50/291* | (2021.01) |

(52) U.S. Cl.
CPC ....... *H01M 10/6551* (2015.04); *F28F 9/0075* (2013.01); *H01M 10/613* (2015.04); *H01M 10/625* (2015.04); *H01M 10/6554* (2015.04); *H01M 50/249* (2021.01); *H01M 50/291* (2021.01); *F28F 2275/08* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 10,520,264 B2 | 12/2019 | Morton et al. | |
| 2015/0044540 A1* | 2/2015 | Morton ............... | H01M 50/204 29/890.035 |
| 2016/0297320 A1* | 10/2016 | Legot ..................... | F28F 13/00 |
| 2017/0125867 A1* | 5/2017 | Beaurepaire .......... | H01M 10/66 |

FOREIGN PATENT DOCUMENTS

| | | | | |
|---|---|---|---|---|
| DE | 102013225628 A1 * | 6/2014 | ........ | H01M 10/6556 |
| KR | 10-1563405 B1 | 10/2015 | | |
| KR | 10-1721256 B1 | 3/2017 | | |
| KR | 10-1844818 B1 | 5/2018 | | |
| WO | WO-2017016829 A1 * | 2/2017 | .............. | F28F 1/022 |

* cited by examiner

Primary Examiner — Robert S Carrico
(74) Attorney, Agent, or Firm — Morgan, Lewis & Bockius LLP

(57) ABSTRACT

A battery contact member allows a high-voltage battery and a cooling device to be evenly in contact with each other. The battery contact member includes an insulating member vertically disposed in the battery housing and having one surface to which the cooling block is coupled in a fitting manner, and a plurality of elastic members each having one surface coupled to the insulating member in a direction toward the other surface of the insulating member, each of the plurality of elastic members having the other surface in contact with an inner surface of the battery housing, and configured to elastically press the insulating member toward the cooling block.

13 Claims, 7 Drawing Sheets

BATTERY CONTACT MEMBER

CROSS-REFERENCE TO RELATED APPLICATION

This application claims priority to and the benefit of Korean Patent Application No. 10-2021-0065112, filed on May 20, 2021, the disclosure of which is incorporated herein by reference in its entirety.

BACKGROUND

1. Field of the Invention

The present invention relates to a battery contact member, and more particularly, to a battery contact member that allows a high voltage battery and a cooling device to be in contact with each other evenly.

2. Discussion of Related Art

In recent years, with increasing interest in environmental protection, instead of a vehicle using the conventional combustion engine, other types of vehicles that are environmentally friendly and consider fuel efficiency, that is, hybrid vehicles and electric vehicles, are being actively developed.

Since the hybrid vehicles are driven using two power sources including an existing engine and a motor driven using electric energy in conjunction with each other, the hybrid vehicles are positioned as real alternative next-generation vehicles that are being spotlighted mainly in the United States, Japan, and Europe due to the reduction of environmental pollution caused by exhaust gas and the effect of improving fuel efficiency.

In general, the hybrid vehicles use an engine, which is driven using gasoline or diesel, as a main power source and a motor as an auxiliary power source, travel using the engine as a power source at a predetermined speed or higher, and travel using the motor as a power source during low speed driving.

Further, the electric vehicles mainly use a motor as a main power source.

A high-voltage battery is used as a power source required for driving the motor, and the high-voltage battery acts as an important factor in a lifetime of electric vehicles as well as hybrid vehicles. Thus, in order to efficiently operate such a battery, the high-voltage battery should be thoroughly managed.

However, when such a high-voltage battery is used for a long time, heat is generated from the battery, and in particular, in the case of a large-capacity battery, more heat is accompanied by an increase in the amount of current during charging or discharging.

In this case, when the generated heat is not sufficiently cooled, the performance of the battery may be degraded or further the battery may be ignited or exploded.

Thus, in order to maintain and improve the performance of the battery, cooling of the battery is essential, and in order to guarantee the lifetime and performance of a battery used in an environmental-friendly vehicle, a cooling device is used in all environmental-friendly vehicles.

Further, in general, a plurality of contact devices arranged to be spaced apart from each other along the circumference of the high-voltage battery so that the high-voltage battery and the cooling device are evenly in contact with each other have been developed.

The contact device according to the related art includes an insulating member which is made of a plastic material and is for electrical insulation between the high-voltage battery and a housing in which the high-voltage battery is accommodated and an elastic member which presses the cooling device so that the cooling device is into contact with the high-voltage battery.

The insulating member and the elastic member are separate members and are used while being assembled with each other.

In detail, the insulating member and the elastic member have lengths corresponding to each other and have a structure in which the elastic member is fixed to surfaces of one end and the other end of the insulating member in a length direction.

For this reason, the compression performance of the elastic member is degraded due to a hole formed by slitting in the insulating member for assembly between the insulating member and the elastic member.

Further, since the elastic member coupled to the insulating member is assembled at only one point of an upper portion of the elastic member in a cross section, and thus the insulating member and the elastic member are easily separated from each other due to a physical force such as vibrations generated while the vehicle is traveling.

For the above reason, in the related field, a method for forcibly assembling the insulating member and the elastic member is being sought, but no satisfactory results have been obtained so far.

SUMMARY OF THE INVENTION

The present invention is directed to providing a battery contact member in which an insulating member and an elastic member may be firmly assembled with each other.

The above-described purpose, other purposes, advantages, and features of the present invention and a method of achieving the above-described purpose, other purposes, advantages, and features will become apparent with reference to embodiments described below in detail together with the accompanying drawings.

According to an aspect of the present invention, a battery contact member may include an insulating member vertically disposed in a battery housing and having one surface to which a cooling block is coupled in a fitting manner, and a plurality of elastic members each having one surface coupled to the insulating member in a direction toward the other surface of the insulating member, each of the plurality of elastic members having the other surface in contact with an inner surface of the battery housing, and configured to elastically press the insulating member toward the cooling block.

The insulating member may include a body part constituting a body, a pair of first extension parts extending from opposite ends of one surface of the body part in a direction in which the cooling block is disposed, and a pair of second extension parts extending from opposite ends of the other surface of the body part in a direction in which the elastic members are arranged.

The body part may have the other surface having a curved shape in a cross section.

The pair of first extension parts may be spaced apart from each other by a width of the cooling block, and the cooling block may be disposed in the first extension parts.

An end of each of the pair of first extension parts may include a first guide boss that protrudes in facing directions and prevents the cooling block from being separated from the body part.

The pair of second extension parts may be spaced apart from each other by a width of the elastic members, and the elastic members may be disposed in the second extension parts.

An end of each of the pair of second extension parts may include a second guide boss that protrudes in facing directions and prevents the elastic members from being separated from the body part.

The elastic members may be arranged between the insulating member and the battery housing.

Each of the elastic members may include a pair of insertion parts disposed between the second guide boss and the body part, leg parts extending from the pair of insertion parts to be inclined in facing directions, first curved surface parts extending from the pair of leg parts and providing a curve in facing directions, second curved surface parts extending from the pair of first curved surface parts and providing a curve in an outward direction, and a connection part connecting the pair of second curved surface parts.

Each of the pair of insertion parts and the second guide boss may have a hook coupling structure.

A plurality of supports spaced apart from each other by a distance in a length direction and inclined in an outward direction may be disposed in the pair of second curved surface parts.

The plurality of supports may be provided in a slitting manner.

The plurality of supports may be in contact with an inner surface of the battery housing.

According to another aspect of the present invention, a battery contact member may include an insulating member vertically disposed in a battery housing and having one surface to which a cooling block is coupled in a fitting manner, and a plurality of elastic members each having one surface coupled to the insulating member in a direction toward the other surface of the insulating member, each of the plurality of elastic members having the other surface in contact with an inner surface of the battery housing, and configured to elastically press the insulating member toward the cooling block. The insulating member may include a plurality of ribs spaced apart from each other on one surface of a body part in a width direction and extending in a length direction.

Slots filled with air to insulate the heat of the high-voltage battery may be provided between the plurality of ribs.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
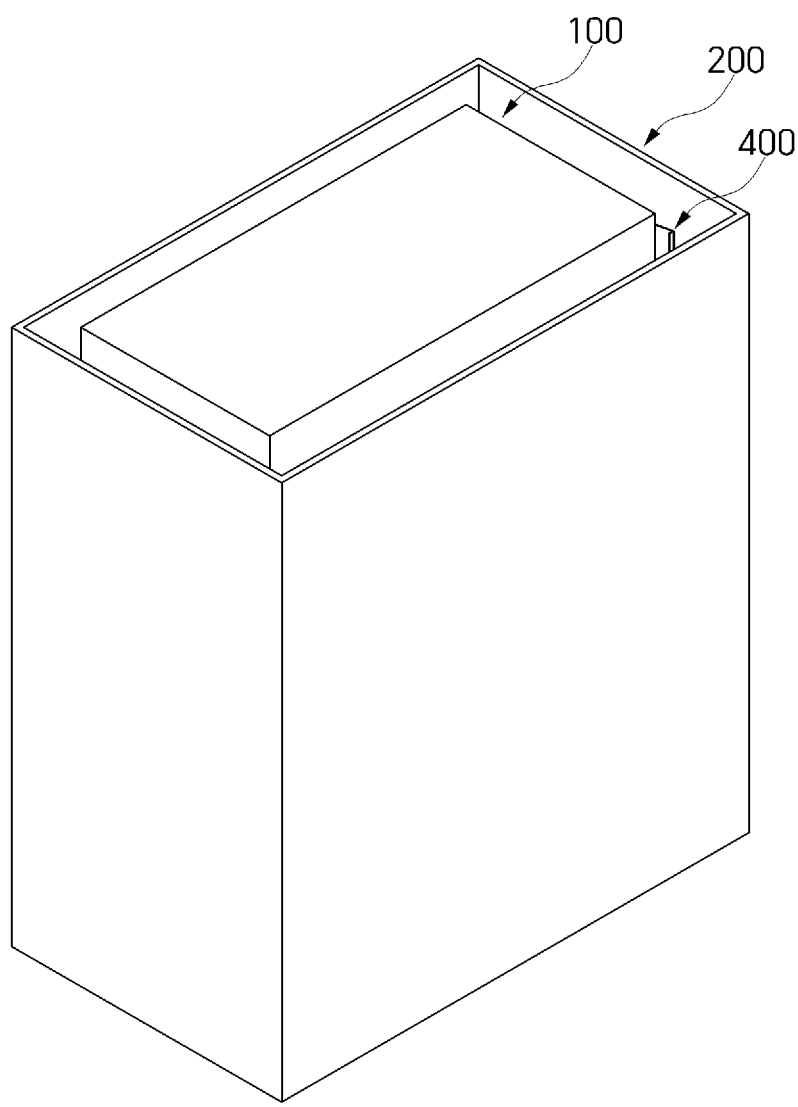
FIG. 1 is a perspective view illustrating a high-voltage battery assembly according to an embodiment of the present invention.

Embodiments of the present invention are provided to more completely describe the present invention to those skilled in the art, the following embodiments may be modified into various other forms, and the scope of the present invention is not limited to the following embodiments. Rather, these embodiments are provided to make this disclosure be more thorough and complete and completely transfer the spirit of the present invention to those skilled in the art. Further, in the following drawings, each component is exaggerated for convenience and clarity of description, and the same reference numerals refer to the same components on the drawings. In the present specification, a term "and/or" includes any one or all possible combinations of the listed items.

Terms used herein are used to describe specific embodiments, not to limit the present invention.

As used in the present specification, a singular form may include a plural form unless the context clearly indicates otherwise. Further, when used in the present specification, the terms "comprise" and/or "comprising" specify the presence of recited shapes, numbers, steps, actions, members, elements, and/or groups thereof, does not exclude the presence or addition of one or more other shapes, numbers, actions, members, and elements and/or groups.

Hereinafter, exemplary embodiments of the present invention will be described in detail with reference to the accompanying drawings.

Figure 2:
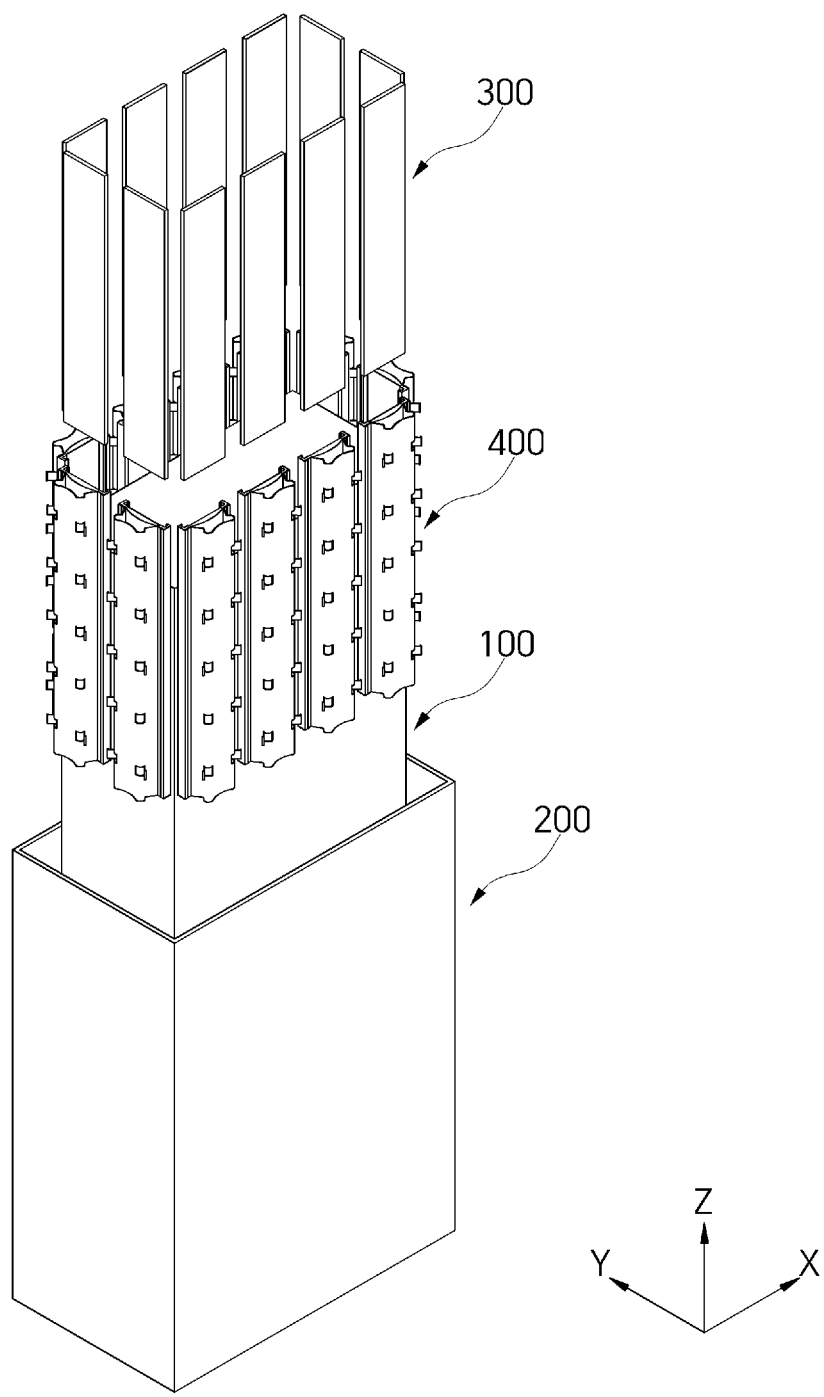
FIG. 2 is an exploded perspective view illustrating a state in which the high-voltage battery assembly is disassembled according to the embodiment of the present invention.
Figure 3:
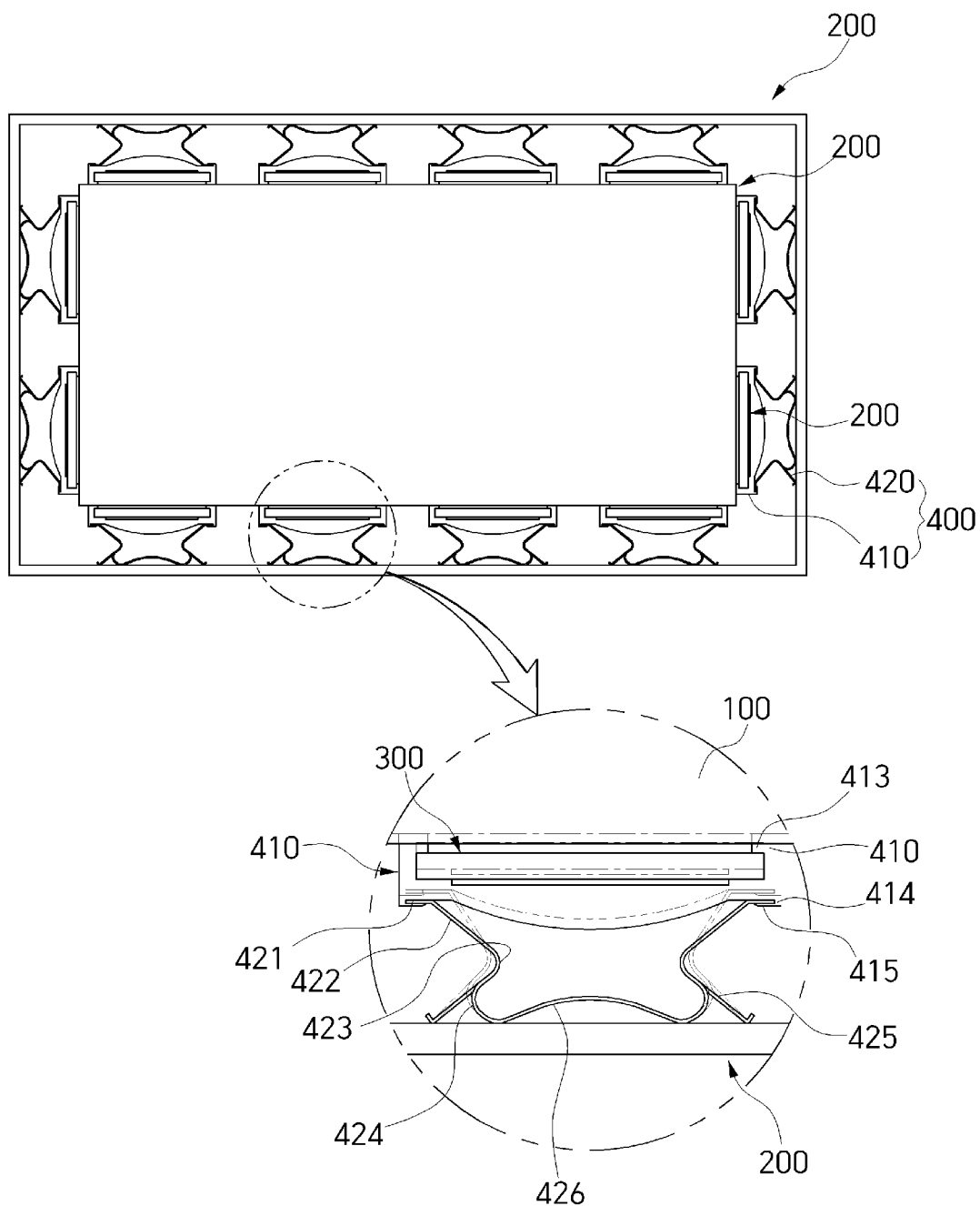
FIG. 3 is a plan view illustrating a flat surface of the high-voltage battery assembly according to the embodiment of the present invention.
Figure 4:
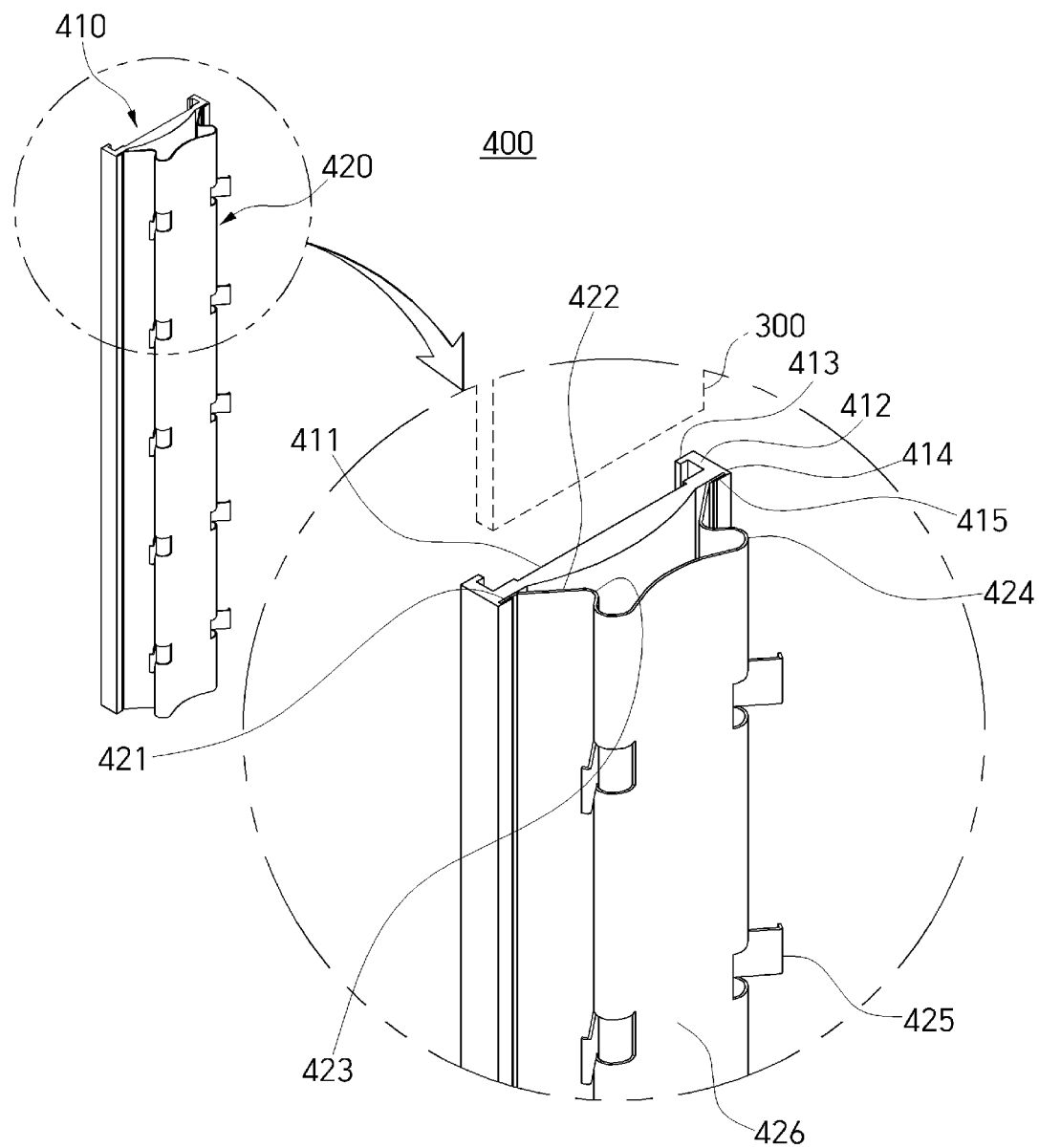
FIG. 4 is a perspective view illustrating a battery contact member according to the embodiment of the present invention.
Figure 5:
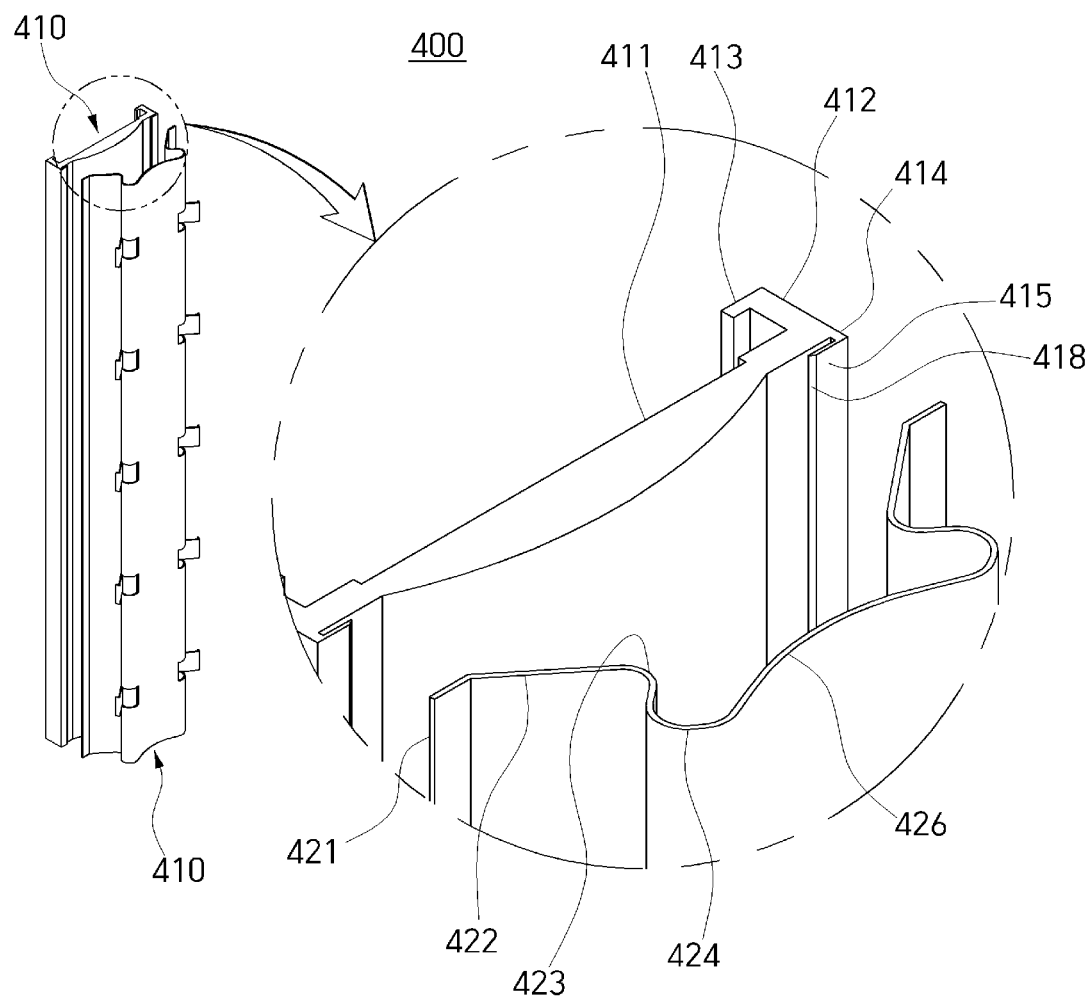
FIG. 5 is an exploded perspective view illustrating a state in which an insulating member and an elastic member are disassembled according to the embodiment of the present invention.
Figure 6:
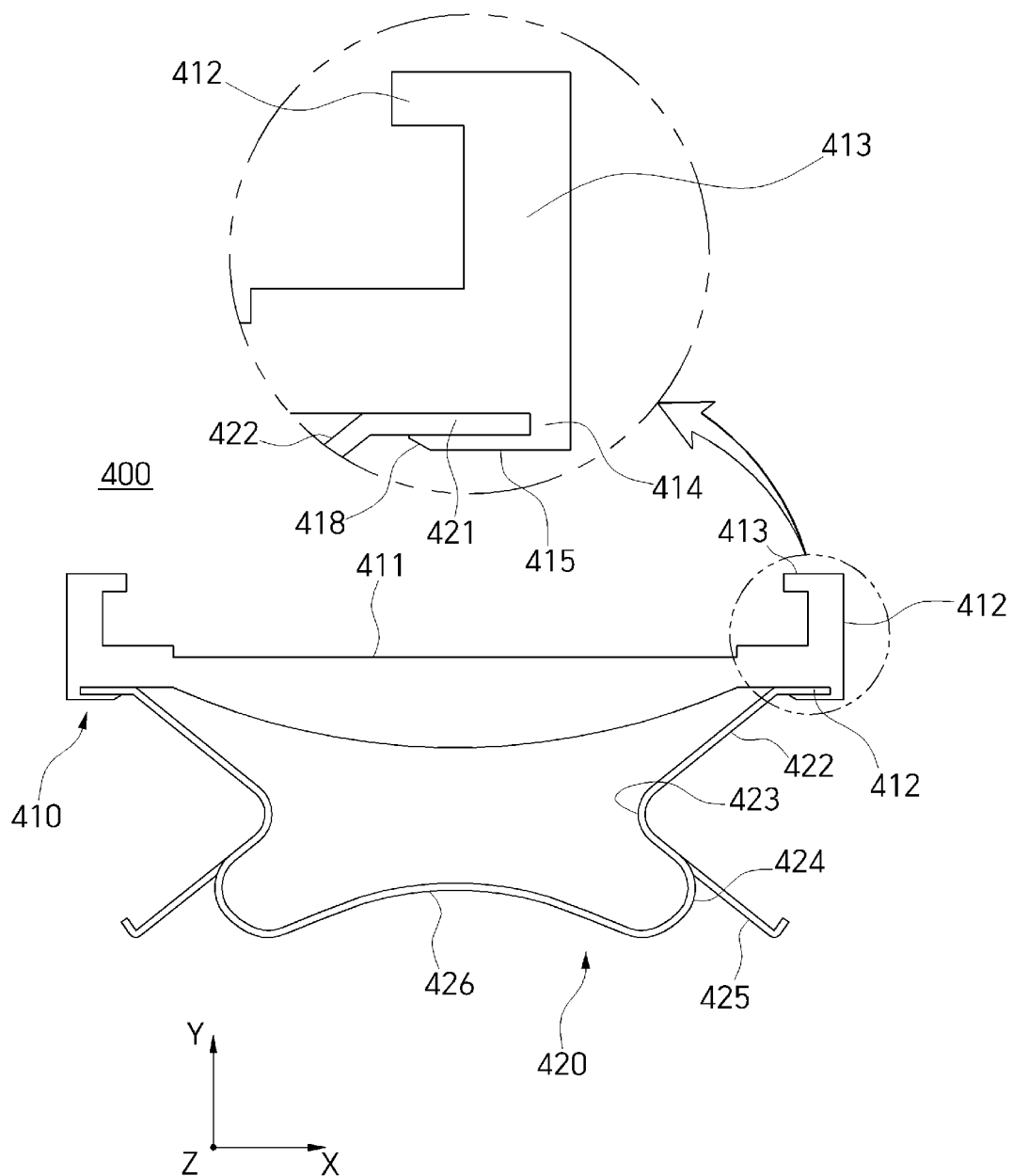
FIG. 6 is a plan view illustrating a flat surface of the battery contact member according to the embodiment of the present invention.

FIG. 1 is a perspective view illustrating a high-voltage battery assembly according to an embodiment of the present invention, FIG. 2 is an exploded perspective view illustrating a state in which the high-voltage battery assembly is disassembled according to the embodiment of the present invention, FIG. 3 is a plan view illustrating a flat surface of the high-voltage battery assembly according to the embodiment of the present invention, FIG. 4 is a perspective view illustrating a battery contact member according to the embodiment of the present invention, FIG. 5 is an exploded perspective view illustrating a state in which an insulating member and an elastic member are disassembled according to the embodiment of the present invention, and FIG. 6 is a plan view illustrating a flat surface of the battery contact member according to the embodiment of the present invention.

First, a battery contact member 400 according to the embodiment of the present invention is applied to a high-voltage battery assembly.

In detail, the high-voltage battery assembly includes a high-voltage battery 100, a battery housing 200, the battery contact member 400, and a cooling block 300.

The high-voltage battery 100 includes a plurality of battery cells and a cover member in which the battery cells are accommodated.

The high-voltage battery 100 stores power to be supplied to a high-voltage battery system.

Further, as illustrated in FIG. 2, when viewed from above, an area of the high-voltage battery 100 is smaller than an area of the battery housing 200.

That is, a peripheral surface of the high-voltage battery 100 is spaced apart from an inner peripheral surface of the battery housing 200 by a distance.

As illustrated in FIG. 3, the battery housing 200 has an accommodation space formed therein, and the high-voltage battery 100, the battery contact member 400, and the cooling block 300 are accommodated in the battery housing 200.

Further, an accommodation part of the battery housing 200 is formed in a shape corresponding to the high-voltage battery 100.

A plurality of high-voltage batteries 100 may be accommodated inside the battery housing 200, or one high-voltage battery 100 may be accommodated thereinside.

Hereinafter, for convenience of description, description will be made on the basis of a case in which one battery housing 200 is accommodated.

The number of the cooling blocks 300 corresponds to the number of the battery contact members 400, and the cooling blocks 300 are each coupled to one of the plurality of battery contact members 400.

Further, the cooling block 300 is in contact with an outer peripheral surface of the high-voltage battery 100 by the battery contact member 400 to effectively cool the high-voltage battery 100.

Hereinafter, the battery contact member 400 according to the embodiment of the present invention will be described.

The battery contact member 400 according to the embodiment of the present invention is disposed between the high-voltage battery 100 and the battery housing 200 and is inserted in a Z direction illustrated in FIG. 2.

Further, a plurality of battery members are provided and are arranged to be spaced apart from each other along a periphery of the high-voltage battery 100 by a distance.

Further, as described above, the cooling block 300 is coupled to the battery contact member 400, and the cooling block 300 is elastically pressed so that the cooling block 300 is in firm contact with the outer peripheral surface of the high-voltage battery 100.

The battery contact member 400 according to the embodiment of the present invention, in which the cooling block 300 accommodated in the battery housing 200 and configured to cool heat of the high-voltage battery 100 is accommodated, includes an insulating member 410 and an elastic member 420.

The insulating member 410 is vertically inserted into the battery housing 200, and the cooling block 300 is coupled to one surface thereof.

The cooling block 300 may be coupled to the insulating member 410 in a fitting manner.

Further, the insulating member 410 is made of a material such as plastic.

Thus, the insulating member 410 may effectively increase insulation performance between the high-voltage battery 100 and the battery housing 200.

Meanwhile, the insulating member may be made of various materials as long as the materials may insulate the high-voltage battery 100 and the battery housing 200 from each other.

The insulating member 410 includes a body part 411, first extension parts 412, second extension parts 414, ribs 416, and slots 417.

The entirety of the body part 411, which constitutes a body of the insulating member 410, is preferably made of a rectangular plate.

The body part 411 has one surface with which the cooling block 300 in contact and the other surface to which the elastic member 420 is coupled.

Further, the other surface of the body part 411, to which the elastic member 420 is coupled, is formed in a curved surface in a cross section.

The first extension parts 412 extend from opposite ends of the one surface of the body part 411 in a direction in which the cooling block 300 is disposed.

Further, the cooling block 300 is coupled between the pair of first extension parts 412 in a fitting manner.

Thus, the pair of first extension parts 412 are spaced apart from each other by the same distance as a width of the cooling block 300.

That is, a width of the body part 411 excluding a thickness of the pair of first extension parts 412 is the same as the width of the cooling block 300.

Thus, inner surfaces of the pair of first extension parts 412 are in contact with both side surfaces of the cooling block 300.

First guide bosses 413 are formed in the first extension parts 412.

The first guide bosses 413 enable the cooling block 300 to be easily inserted between the pair of first extension parts 412.

In particular, the first guide bosses 413 enable the other surface of the cooling block 300 inserted between the pair of first extension parts 412 to be in firm contact with the one surface of the body part 411.

To this end, the first guide bosses 413 protrude from ends of the pair of first extension parts 412 in facing directions.

Thus, the other surfaces of the first guide bosses 413 are in contact with one surface of the cooling block 300.

For this reason, the first guide bosses 413 may effectively prevent the cooling block 300 inserted between the pair of first extension parts 412 from being separated from the body part 411.

The second extension parts 414 extend from opposite ends of the other surface of the body part 411 in a direction in which the elastic member 420 is disposed.

Further, the elastic member 420 is coupled between the pair of second extension parts 414 in a fitting manner or a sliding manner.

Thus, the pair of second extension parts 414 are spaced apart from each other by the same distance as a width of the elastic member 420.

Thus, inner surfaces of the pair of second extension parts 414 are in contact with both side surfaces of the elastic member 420.

Second guide bosses 415 are formed in the second extension parts 414.

The second guide bosses 415 enable the elastic member 420 to be easily coupled between the pair of second extension parts 414.

In particular, the second guide bosses 415 enable the other surface of the elastic member 420 inserted between the pair of second extension parts 414 to be in firm contact with the one surface of the body part 411.

To this end, the second guide bosses 415 protrude from ends of the pair of second extension parts 414 in facing directions.

Thus, the other surfaces of the second guide bosses 415 are in contact with one surface of the elastic member 420.

For this reason, the second guide bosses 415 may effectively prevent the elastic member 420 inserted between the pair of second extension parts 414 from being separated from the body part 411.

The elastic member 420 is provided as a plurality of elastic members 420, and in detail, the number of the elastic members 420 corresponds to the number of the insulating members 410.

Further, the elastic member 420 is coupled to the insulating member 410 on which the cooling block 300 is mounted and elastically presses the insulating member 410 so as to elastically press the cooling block 300 in a direction toward the high-voltage battery 100.

To this end, the one surface of the elastic member 420 is coupled to the insulating member 410 in a direction toward the other surface of the insulating member 410, and the other surface thereof is in contact with an inner surface of the battery housing 200.

Thus, the elastic member 420 is disposed between the insulating member 410 and the battery housing 200 and is coupled to the other surface of the insulating member 410 through the second extension parts 414 and the second guide bosses 415 of the body part 411.

Further, the other end of the elastic member 420 is in contact with the inner surface of the battery housing 200 to elastically press the insulating member 410 in the direction toward the high-voltage battery 100.

For this reason, the cooling block 300 may be in firm contact with the outer peripheral surface of the high-voltage battery 100 due to an elastic force of the elastic member 420.

Meanwhile, as described above, the other surface of the body part 411 is formed in a curved surface.

Thus, when the elastic member 420 is coupled to the body part 411 having the other surface formed in a curved surface, an insertion part 421 of the elastic member 420 may be easily widened in a direction toward the second extension parts 414 of the body part 411 along a curved surface formed in the other surface of the body part 411 while being in contact with a curved surface of the other surface of the body part 411 formed in a curved surface.

For this reason, when the elastic member 420 is assembled with the insulating member 410, the elastic member 420 may be easily coupled to the second extension parts 414 and the second guide bosses 415 along the curved surface of the body part 411.

The elastic member 420 includes the insertion part 421, a leg part 422, a first curved surface part 423, a second curved surface part 424, and a connection part 426.

The insertion part 421 is provided as a pair of insertion parts 421, and the insertion parts 421 are inserted between the first extension parts 412 and the second guide bosses 415 and the body part 411.

The insertion part 421 is coupled to the insulating member 410 in a hook coupling structure due to the second guide boss 415.

Further, the insertion parts 421 are coupled to the pair of second extension parts 414 in a fitting manner or a sliding manner.

Meanwhile, when the insertion parts 421 are coupled to the second guide bosses 415 in a fitting manner, inclination parts 418 are formed on surfaces of the second guide bosses 415, which face each other.

In detail, the inclination parts 418 have a shape in which a width of a surface between the pair of inclination parts 418 is gradually decreased in the direction in which the cooling block 300 is disposed.

For this reason, when the elastic member 420 is assembled with the insulating member 410, the insertion parts 421 of the elastic member 420 slide along the inclination parts 418 of the second guide bosses 415 and thus may be easily fitted between the first extension parts 412, the second guide bosses 415, and the body part 411.

The leg part 422 is provided as a pair of leg parts 422, and the leg parts 422 extend to be inclined from the pair of insertion parts 421 in an inward direction that is a direction in which the leg parts 422 face each other.

The first curved surface part 423 is provided as a pair of first curved surface parts 423, and each of the first curved surface parts 423 extend from one end of the pair of leg parts 422.

In detail, the first curved surface parts 423 form a curve in an inward direction that is a direction in which opposite ends of the first curved surface parts 423 in a width direction, which is an X direction illustrated in FIG. 6, face each other.

The second curved surface part 424 is provided as a pair of second curved surface parts 424, and each of the second curved surface parts 424 extend from one end of the pair of first curved surface parts 423.

In detail, the second curved surface parts 424 form a curve in an outward direction with respect to a width direction that is an X direction illustrated in FIG. 6.

The connection part 426, which connects the pair of second curved surface parts 424, has the other surface in contact with the inner surface of the battery housing 200.

Thus, when the elastic member 420 is coupled to the insulating member 410, while the connection part 426 is moved in the direction in which the cooling block 300 is disposed, the first curved surface parts 423 and the second curved surface parts 424 are elastically deformed, and thus the leg parts 422 and the insertion parts 421 are elastically moved in an outward direction.

For this reason, the insertion part 421 is easily connected to the second extension part 414 and the second guide boss 415, and thus the elastic member 420 may be firmly fixed to the insulating member 410.

Further, when the connection part 426 supports the inner surface of the battery housing 200, the elastic member 420 elastically presses the insulating member 410 coupled to the insertion part 421 due to an elastic force that contracts the first curved surface part 423 and the second curved surface part 424 in facing directions.

Thus, the cooling block 300 coupled to the insulating member 410 may elastically press the high-voltage battery 100.

Meanwhile, a support 425 is formed in the second curved surface part 424 of the present invention.

The support 425 is provided as a plurality of supports 425 for the pair of second curved surface part 424, and the supports 425 are spaced apart from each other by a distance in a length direction and are formed to be inclined in an outward direction.

It is preferable that the support 425 is formed in the second curved surface part 424 in a slitting method.

Further, in a state in which the supports 425 extend in both directions, ends thereof are in contact with the inner surface of the battery housing 200.

Thus, since the supports 425 extend from the pair of second curved surface parts 424 in both directions and are supported on the inner surface of the battery housing 200, the elastic member 420 and the insulating member 410 coupled to the elastic member 420 can be effectively prevented from shaking inside the battery housing 200 in a left-right direction.

Meanwhile, in a battery contact member 400 according to another embodiment of the present invention, the ribs 416 may be formed in the body part 411.

Hereinafter, the battery contact member 400 according to another embodiment of the present invention, in which the ribs 416 are formed in the body part 411, will be described in detail with reference to the accompanying drawings.

Figure 7:
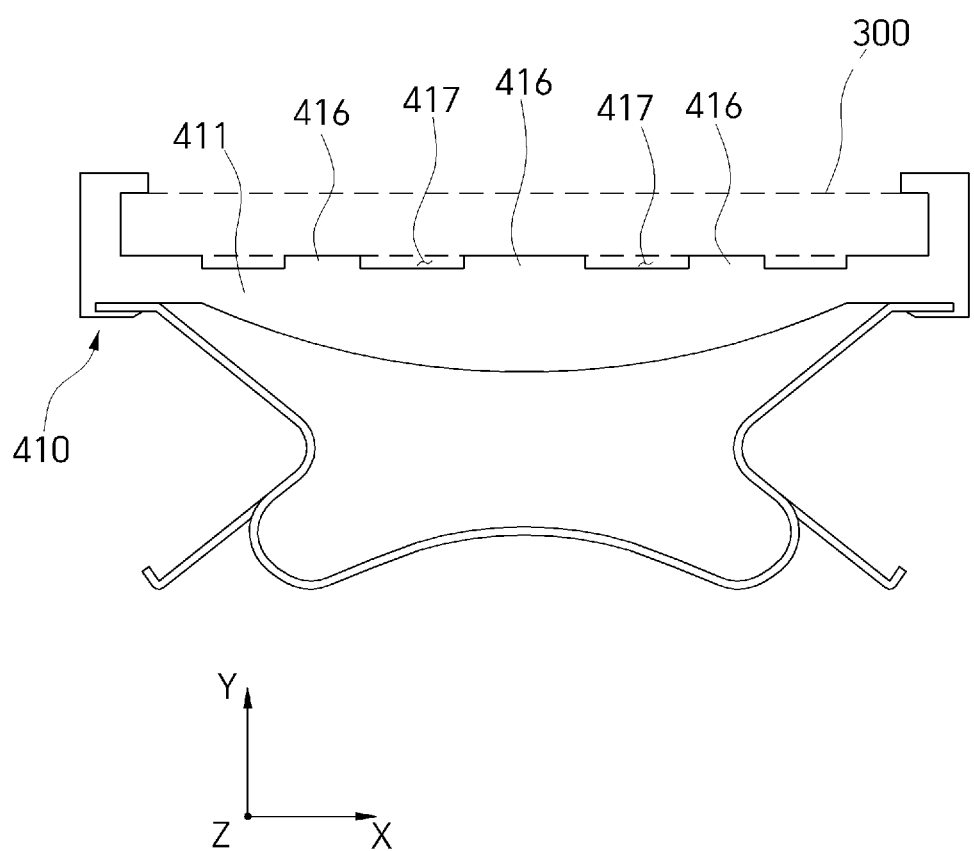
FIG. 7 is a plan view illustrating a flat surface of a battery contact member according to another embodiment of the present invention.

FIG. 7 is a plan view illustrating a flat surface of a battery contact member according to another embodiment of the present invention.

A detailed description of the same configuration as that described in the above-described embodiment will be omitted.

Referring to FIG. 7, the insulating member 410 according to another embodiment of the present invention may further include the ribs 416.

The plurality of ribs 416 are spaced apart from each other on the one surface of the body part 411 in the direction in which the cooling block 300 is disposed by a distance in a width direction that is an X direction illustrated in FIG. 7.

Further, the ribs 416 extend in the length direction of the body part 411 made of a rectangular plate material.

Thus, the ribs 416 allow the cooling block 300 inserted into the insulating member 410 to be spaced part from the body part 411 by a distance.

The slots 417 are formed between the plurality of ribs 416.

Air layers formed between the plurality of ribs 416 are formed in the slots 417.

The slots 417 form the air layers between the plurality of ribs 416 to block electrical connection of the high-voltage battery 100 and to insulate heat generated from the high-voltage battery 100 and passing through the cooling block 300.

Further, the slots 417 may supplement assembly tolerance generated in a process of designing the battery contact member 400.

According to the present invention, an upper portion and a lower portion of a high-voltage battery can be uniformly cooled, the performance of the battery can be effectively improved by minimizing a temperature deviation between the high-voltage batteries, and thus the lifetime of the battery can be increased.

Further, thermal runaway of the battery under both extreme environmental conditions and driving conditions can be effectively prevented, thereby securing safety.

In this way, the embodiments disclosed in the present specification should be considered not from a limiting viewpoint but in an exemplary viewpoint. The scope of the present invention is indicated not in the above description but in the appended claims, and all differences within the scope equivalent thereto should be construed as being included in the present invention.

What is claimed is:

1. A battery contact member which is accommodated in a battery housing and in which a cooling block configured to dissipate heat of a battery is accommodated, the battery contact member comprising:
    an insulating member vertically disposed in the battery housing and having one surface to which the cooling block is coupled in a fitting manner; and
    an elastic member having one surface coupled to the insulating member in a direction toward another surface of the insulating member, the elastic member having another surface in contact with an inner surface of the battery housing, and configured to elastically press the insulating member toward the cooling block,
    wherein the insulating member includes a body part constituting a body and a pair of second extension parts extending from opposite ends of one surface of the body part,
    an end of each of the pair of second extension parts includes a second guide boss that protrudes in facing directions and prevents the elastic member from being separated from the body part, and
    the elastic member includes:
        a pair of insertion parts disposed between the second guide boss and the body part,
        a pair of leg parts extending from the pair of insertion parts to be inclined in facing directions;
        a pair of first curved surface parts extending from the pair of leg parts and providing a curve in facing directions;
        a pair of second curved surface parts extending from the pair of first curved surface parts and providing a curve in an outward direction; and
        a connection part connecting the pair of second curved surface parts.

2. The battery contact member of claim 1, wherein the insulating member further includes:
    a pair of first extension parts extending from opposite ends of another surface of the body part in a direction in which the cooling block is disposed.

3. The battery contact member of claim 2, wherein the pair of first extension parts are spaced apart from each other by a width of the cooling block, and the cooling block is disposed in the pair of first extension parts.

4. The battery contact member of claim 2, wherein an end of each of the pair of first extension parts includes a first guide boss that protrudes in facing directions and prevents the cooling block from being separated from the body part.

5. The battery contact member of claim 1, wherein the one surface of the body part has a curved shape in a cross section.

6. The battery contact member of claim 1, wherein the pair of second extension parts are spaced apart from each other by a width of the elastic member, and the elastic member are disposed in the pair of second extension parts.

7. The battery contact member of claim 1, wherein each of the pair of insertion parts and the second guide boss has a hook coupling structure.

8. The battery contact member of claim 1, wherein a plurality of supports spaced apart from each other by a distance in a length direction and inclined in an outward direction are disposed in the pair of second curved surface parts.

9. The battery contact member of claim 8, wherein the plurality of supports are provided in a slitting manner.

10. The battery contact member of claim 8, wherein the plurality of supports are in contact with the inner surface of the battery housing.

11. The battery contact member of claim 1, wherein the elastic member is arranged between the insulating member and the battery housing.

12. A battery contact member which is accommodated in a battery housing and in which a cooling block configured to dissipate heat of a battery is accommodated, the battery contact member comprising:

an insulating member vertically disposed in the battery housing and having one surface to which the cooling block is coupled in a fitting manner; and an elastic member having one surface coupled to the insulating member in a direction toward another surface of the insulating member, the elastic member having another surface in contact with an inner surface of the battery housing, and configured to elastically press the insulating member toward the cooling block, wherein the insulating member includes a plurality of ribs spaced apart from each other on one surface of a body part in a width direction and extending in a length direction, the insulating member includes a pair of extension parts extending from opposite ends of the one surface of the body part, an end of each of the pair of extension parts includes a guide boss that protrudes in facing directions and prevents the elastic member from being separated from the body part, and the elastic member includes:
- a pair of insertion parts disposed between the guide boss and the body part,
- a pair of leg parts extending from the pair of insertion parts to be inclined in facing directions;
- a pair of first curved surface parts extending from the pair of leg parts and providing a curve in facing directions;
- a pair of second curved surface parts extending from the pair of first curved surface parts and providing a curve in an outward direction; and
- a connection part connecting the pair of second curved surface parts.

13. The battery contact member of claim 12, wherein slots filled with air to insulate the heat of the battery are provided between the plurality of ribs.

* * * * *